United States Patent
Sewell et al.

(10) Patent No.: US 9,272,841 B1
(45) Date of Patent: Mar. 1, 2016

(54) COLLAPSIBLE RADIANT BARRIER VOID FILLER

(71) Applicants: Matthew Watson Sewell, El Dorado Hills, CA (US); Eric Daniel Kvilhaug, Winters, CA (US)

(72) Inventors: Matthew Watson Sewell, El Dorado Hills, CA (US); Eric Daniel Kvilhaug, Winters, CA (US)

(73) Assignee: Sunrise Mfg. Inc., Rancho Cordova, CA (US)

( * ) Notice: Subject to any disclaimer, the term of this patent is extended or adjusted under 35 U.S.C. 154(b) by 0 days.

(21) Appl. No.: 14/079,435

(22) Filed: Nov. 13, 2013

Related U.S. Application Data (60) Provisional application No. 61/726,427, filed on Nov. 14, 2012.

(51) Int. Cl.
| | |
|---|---|
| *B32B 3/12* | (2006.01) |
| *B65D 90/02* | (2006.01) |
| *B60P 7/16* | (2006.01) |

(52) U.S. Cl.
CPC . *B65D 90/02* (2013.01); *B60P 7/16* (2013.01); *Y10S 206/814* (2013.01); *Y10T 428/24149* (2015.01)

(58) Field of Classification Search
CPC ................. Y10T 428/24149; Y10T 156/1003; Y10T 428/24165; B61D 45/008; B61D 45/006; B65D 90/02
USPC ........................................... 160/40, 351, 352
See application file for complete search history.

(56) References Cited

U.S. PATENT DOCUMENTS

| | | | | |
|---|---|---|---|---|
| 2,001,632 A | * | 5/1935 | Schlichting | 428/118 |
| 2,674,295 A | * | 4/1954 | Steele | 156/197 |
| 2,848,132 A | * | 8/1958 | Davous | 217/23 |
| 3,405,659 A | * | 10/1968 | Hees | 410/154 |
| 3,581,675 A | * | 6/1971 | Kauffman | 410/154 |
| 3,593,671 A | * | 7/1971 | Bramlett | 410/154 |
| 3,709,161 A | * | 1/1973 | Kauffman | 108/57.34 |
| 3,823,675 A | * | 7/1974 | Farley | 410/154 |
| 3,850,112 A | * | 11/1974 | Jaski | 410/154 |
| 4,109,587 A | * | 8/1978 | Jansen, Jr. | 410/154 |
| 4,247,237 A | * | 1/1981 | Brown | 410/154 |
| 4,300,864 A | * | 11/1981 | Liebel et al. | 410/154 |
| 4,349,303 A | * | 9/1982 | Liebel et al. | 410/154 |
| 4,363,579 A | * | 12/1982 | Rogers | 410/154 |
| 4,372,717 A | * | 2/1983 | Sewell et al. | 410/154 |
| 4,516,891 A | * | 5/1985 | Wnuk et al. | 410/154 |
| 4,585,381 A | * | 4/1986 | Boyse | 410/154 |
| 4,865,889 A | * | 9/1989 | Boyse | 428/12 |
| 4,936,229 A | * | 6/1990 | Parnell | 108/51.3 |

(Continued)

*Primary Examiner* — Katherine Mitchell
*Assistant Examiner* — Justin Rephann
(74) *Attorney, Agent, or Firm* — Dennis A. DeBoo; Audrey A. Millemann; Weintraub Tobin (57) ABSTRACT

Collapsible radiant barrier void filler, comprising: first and second scored sheets having interior and exterior surfaces and fold lines to attain collapsed and expanded configurations; a cell core being collapsible to a closed cell configuration and expandable to an open cell configuration, the cell core having end portions secured to oppositely disposed portions of the interior surfaces of the scored sheets, and the cell core having oppositely disposed cell side portions; and a radiant barrier having a reflective first side and an opposing second side wherein the second side is disposed upon at least one of the interior surfaces of one of the scored sheets and wherein the first reflective side is juxtaposed adjacent at least one of the oppositely disposed cell side portions in the expanded open cell configuration so as to maintain an air space adjacent the first reflective side that extends into the cell core.

15 Claims, 8 Drawing Sheets

(56) References Cited

U.S. PATENT DOCUMENTS

| | | | | |
|---|---|---|---|---|
| 5,062,751 A | * | 11/1991 | Liebel | 410/154 |
| 5,102,272 A | * | 4/1992 | Woods et al. | 410/154 |
| 5,132,156 A | * | 7/1992 | Trassare et al. | 428/116 |
| 5,139,842 A | * | 8/1992 | Sewell | 428/116 |
| 5,171,114 A | * | 12/1992 | Dunn | 410/154 |
| 5,181,814 A | * | 1/1993 | Woods et al. | 410/122 |
| 5,285,542 A | * | 2/1994 | West et al. | 5/500 |
| 5,306,100 A | * | 4/1994 | Higginbotham | 410/154 |
| 5,413,823 A | * | 5/1995 | Lo Presti et al. | 428/12 |
| 5,413,824 A | * | 5/1995 | Van Erden | 428/12 |
| 5,484,241 A | * | 1/1996 | Haywood et al. | 410/154 |
| 5,486,078 A | * | 1/1996 | Wise et al. | 410/155 |
| 5,573,818 A | * | 11/1996 | Haywood et al. | 428/12 |
| 5,846,038 A | * | 12/1998 | Bostelman | 410/154 |
| 5,855,459 A | * | 1/1999 | Krier et al. | 410/155 |
| 6,264,410 B1 | * | 7/2001 | Keip et al. | 410/35 |
| 6,797,356 B2 | * | 9/2004 | Zupon et al. | 428/131 |
| 7,056,575 B2 | * | 6/2006 | Aanestad | 428/304.4 |
| 7,214,016 B2 | * | 5/2007 | Nelson et al. | 410/129 |
| 7,416,091 B2 | * | 8/2008 | Yong | 220/1.6 |
| 7,425,515 B2 | * | 9/2008 | Fellinger et al. | 442/34 |
| D629,687 S | * | 12/2010 | Baker | D9/456 |
| 8,256,488 B2 | * | 9/2012 | Ruggles et al. | 160/84.04 |
| 8,579,007 B2 | * | 11/2013 | Pottmeyer et al. | 160/229.1 |
| 2005/0042433 A1 | * | 2/2005 | Jones et al. | 428/292.1 |
| 2007/0245664 A1 | * | 10/2007 | Orologio | 52/508 |
| 2007/0248805 A1 | * | 10/2007 | Orologio | 428/304.4 |
| 2008/0197649 A1 | * | 8/2008 | Byler et al. | 296/39.3 |
| 2009/0291295 A1 | * | 11/2009 | Chung et al. | 428/328 |
| 2010/0183398 A1 | * | 7/2010 | Nelson et al. | 410/129 |
| 2013/0207413 A1 | * | 8/2013 | Lookebill et al. | 296/182.1 |

* cited by examiner

COLLAPSIBLE RADIANT BARRIER VOID FILLER

CROSS-REFERENCE TO RELATED APPLICATIONS

This application claims priority under 35 USC Section 119(e) to U.S. Provisional Patent Application No. 61/726,427, filed Nov. 14, 2012, the entire disclosure of which is incorporated herein by reference.

FIELD OF THE INVENTION

This invention relates generally to void fillers and, in particular, to collapsible void fillers.

BACKGROUND OF THE INVENTION

Currently, void fillers, typically made from corrugated paperboard or cardboard are used as lightweight spacers and stabilizers for filing voids between cargo loads of product being transported in, for example, rail cars, trucks, and shipping containers.

For example, cargo loads comprised of beverages or perishable food in containers such as boxes or crates are typically transported on pallets which are generally lined up in rows that are spaced from one another and stacked one on top of another in, for example, a rail car, truck, or shipping container. During the loading of the pallets or thereafter, void fillers are located to fill voids between the pallets of containers or between such pallets of containers and one or more walls of the rail car, truck, or shipping container to stabilize the cargo loads.

BRIEF SUMMARY OF THE INVENTION

In one aspect, an embodiment of the invention provides a collapsible radiant barrier void filler, comprising: a scored sheet having an interior surface, an exterior surface, and fold lines to attain collapsed and expanded configurations; a cell core being collapsible to a closed cell configuration and expandable to an open cell configuration, the cell core having end portions secured to oppositely disposed portions of the interior surface of the scored sheet, and the cell core having oppositely disposed cell side portions; and a radiant barrier having a reflective first side and an opposing second side wherein the second side is secured upon the interior surface of the scored sheet and wherein the reflective first side is juxtaposed adjacent at least one of the oppositely disposed cell side portions in the expanded open cell configuration so as to maintain an air space adjacent the reflective first side wherein the air space extends into the cell core in said open cell configuration. In other aspects, an embodiment of the collapsible radiant barrier void filler as described above has the second side of the radiant barrier secured upon the exterior surface of the scored sheet instead of the interior surface and, in yet another embodiment, a second side of a second radiant barrier is secured upon the exterior surface of the scored sheet in addition to the radiant barrier being secured to the interior surface of the scored sheet.

In another aspect, an embodiment of the invention provides a collapsible radiant barrier void filler, comprising: first and second scored sheets having interior and exterior surfaces and fold lines to attain collapsed and expanded configurations; a cell core being collapsible to a closed cell configuration and expandable to an open cell configuration, the cell core having end portions secured to oppositely disposed portions of the interior surfaces of the scored sheets, and the cell core having oppositely disposed cell side portions; and a radiant barrier having a reflective first side and an opposing second side wherein the second side is secured upon at least one of the interior surfaces of one of the scored sheets and wherein the reflective first side is juxtaposed adjacent at least one of the oppositely disposed cell side portions in the expanded open cell configuration so as to maintain an air space adjacent the reflective first side wherein the air space extends into the cell core in said open cell configuration. In other aspects, an embodiment of the collapsible radiant barrier void filler as described above has the second side of the radiant barrier secured upon at least one of the exterior surfaces of one of the scored sheets instead of at least one of the interior surfaces and, in yet another embodiment, a second side of a second radiant barrier is secured upon at least one of the exterior surfaces of one of the scored sheets in addition to the radiant barrier being secured upon at least one of the interior surfaces of one of the scored sheets.

Accordingly, having thus summarized embodiments of the invention, it should be apparent that numerous modifications and adaptations may be resorted to without departing from the scope and fair meaning of the present invention as set forth hereinbelow by the claims.

DETAILED DESCRIPTION OF THE INVENTION

Considering the drawings, wherein like reference numerals denote like parts throughout the various drawing figures, reference numeral 100 is directed to a collapsible radiant barrier or radiant heat barrier void filler.

Figure 1:
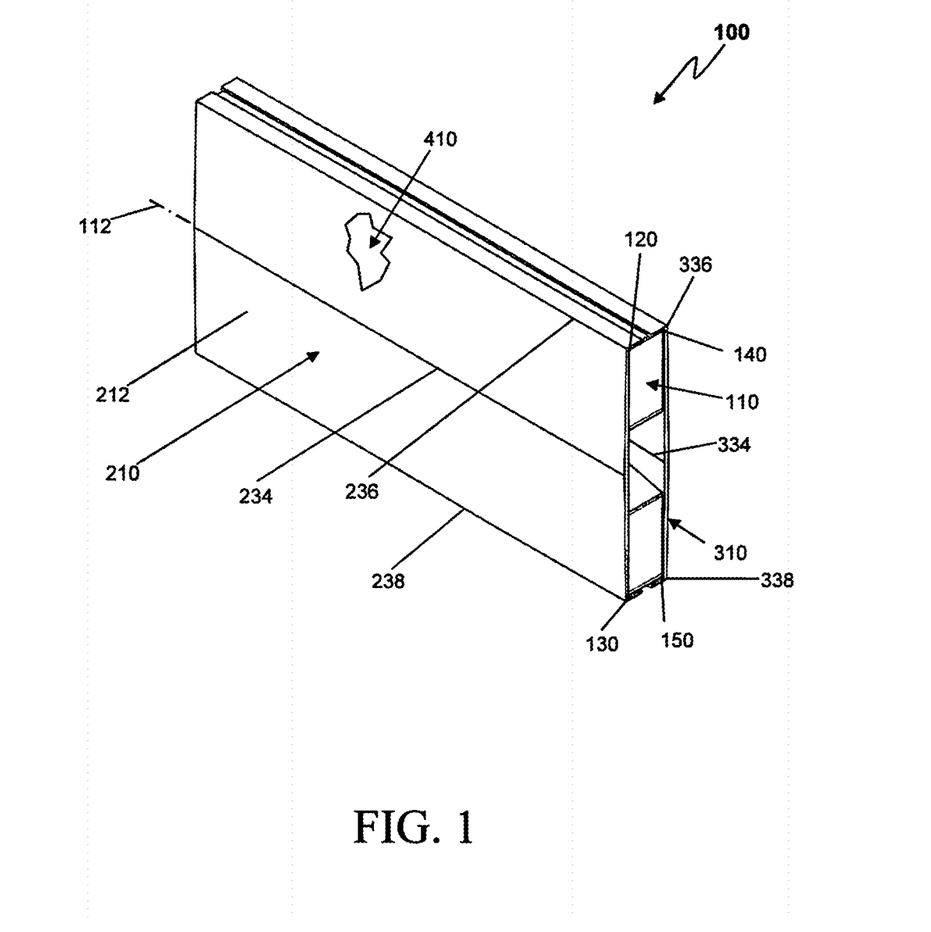
FIG. 1 is perspective view of an embodiment of a collapsible radiant barrier void filler in an expanded configuration.
Figure 2:
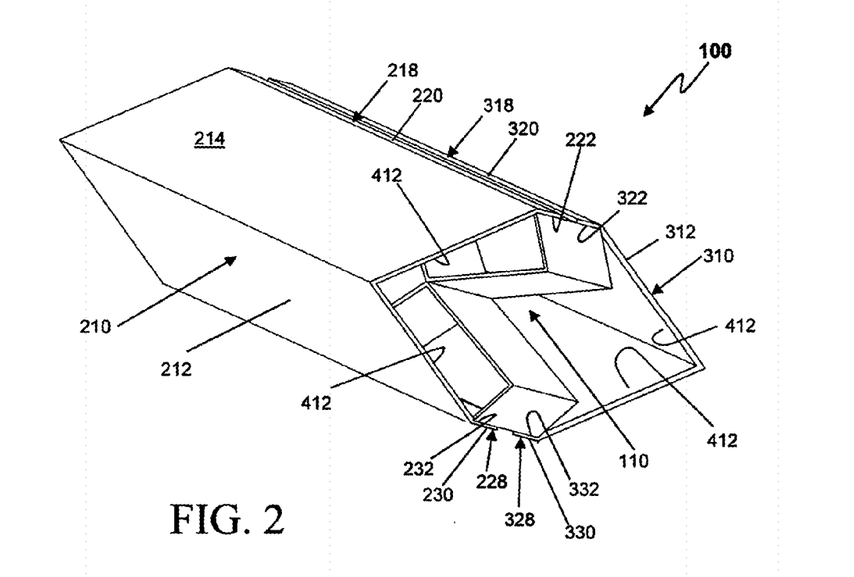
FIG. 2 is perspective view of an embodiment of the collapsible radiant barrier void filler in a partially collapsed/opened configuration.
Figure 3:
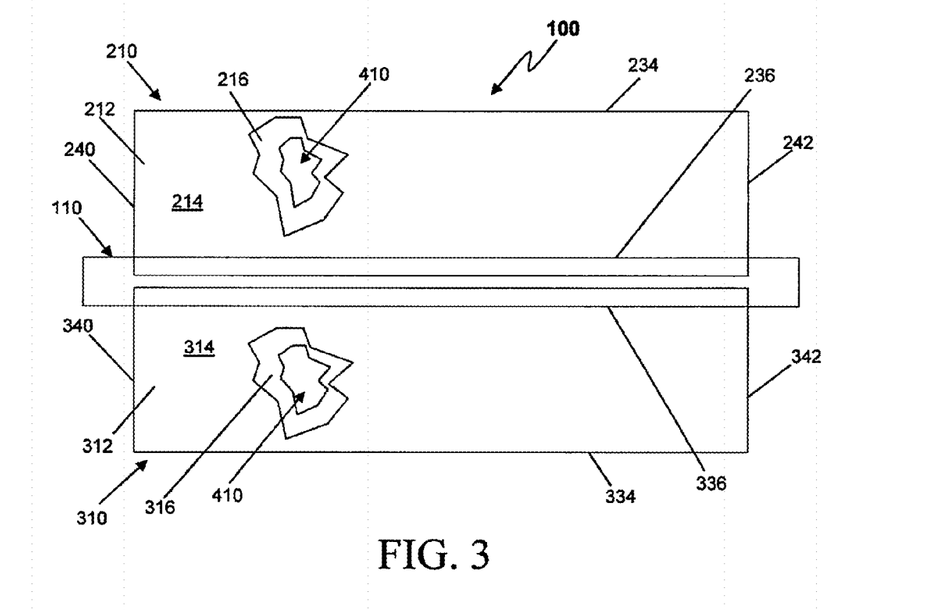
FIG. 3 is perspective view of an embodiment of the collapsible radiant barrier void filler in a collapsed configuration.

Referring to FIGS. 1 through 3, and in one embodiment, the collapsible radiant barrier void filler 100 is comprised of a collapsible and expandable open cell central core structure 110; a first scored sheet 210 and a second scored sheet 310 sandwiching the open cell central core structure 110 in an expanded configuration; and a radiant barrier material 410 disposed on at least a portion of at least one of the first and second scored sheets 210 and 310.

In the embodiment illustrated in FIGS. 1 through 3, the collapsible radiant barrier void filler 100 has, but is not limited to, a three-dimensional rectangular shape when the radiant barrier void filler 100 is in the expanded configuration. Notwithstanding, other embodiments of the collapsible radiant barrier void filler may take the form of, for example, a three-dimensional triangular, circular, square, or oval geometric expanded configuration.

Collapsible and Expandable Open Cell Core Structure

More specifically, and as noted above, the collapsible radiant barrier void filler 100 comprises collapsible and expandable open cell central core structure 110.

Figure 4:
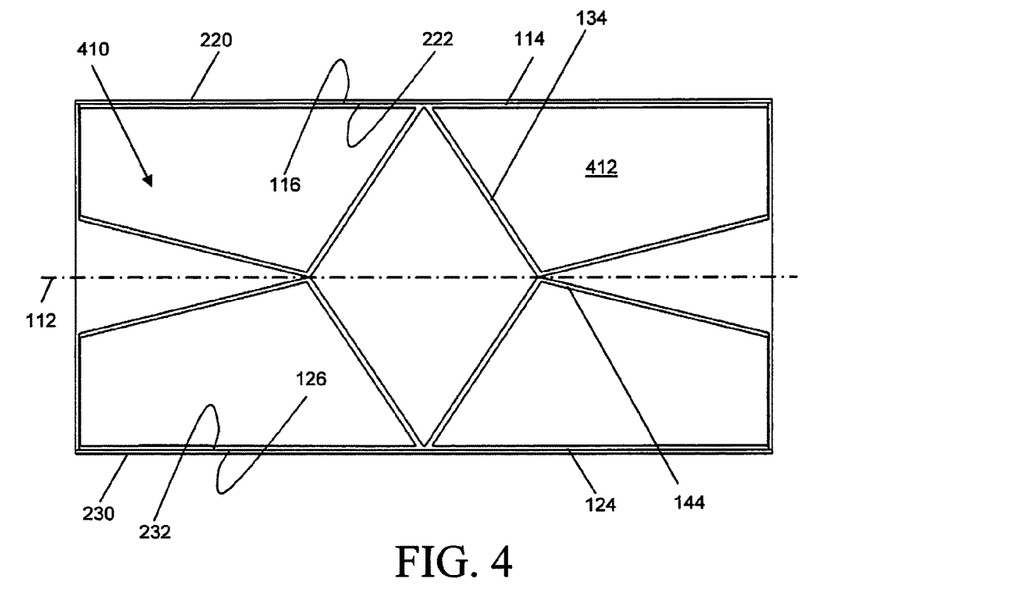
FIG. 4 is an elevational view of an embodiment of the collapsible radiant barrier void filler with a second scored sheet removed therefrom to illustrate an embodiment of a collapsible and expandable open cell core structure.
Figure 5:
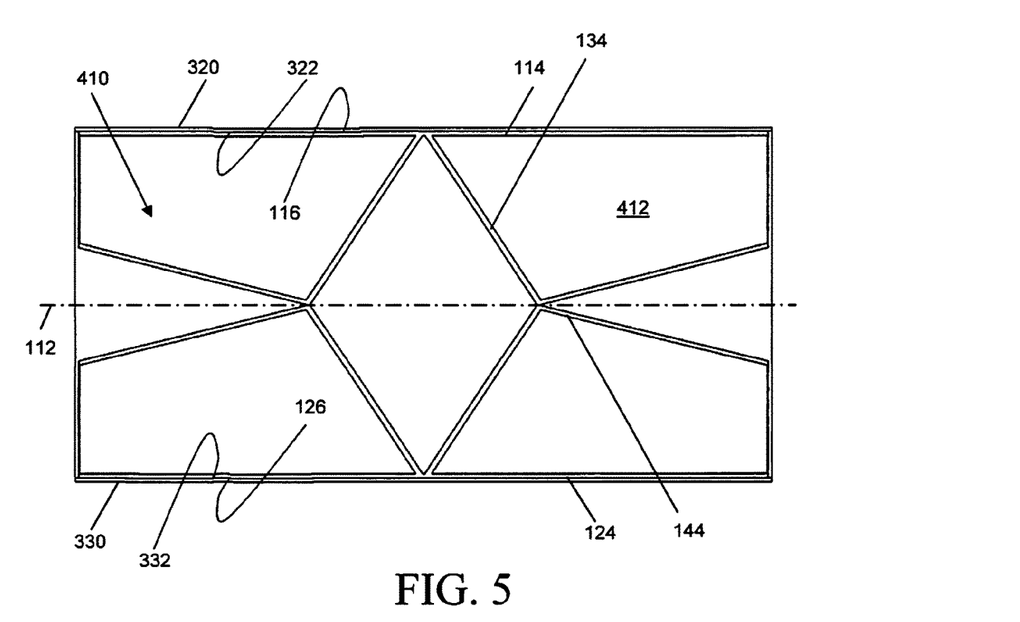
FIG. 5 is another elevational view of an embodiment of the collapsible radiant barrier void filler with a first scored sheet removed therefrom to illustrate an embodiment of the collapsible and expandable open cell core structure.

Referring to FIGS. 4 and 5, the central core structure 110 has a longitudinally extending medial axis 112 and comprises first and second outer strips 114 and 124 and first and second inner strips 134 and 144. The first and second outer strips 114, 124 and the first and second inner strips 134 and 144 have respective medial sides, sides toward medial axis 112, and respective lateral sides, sides away from medial axis 112.

To form the core structure 110 the strips 114, 124, 134, and 144 are attached as follows: the medial side of the first outer strip 114 is attached to the lateral side of the first inner strip 134 at three locations; the medial side of the first inner strip 134 is attached to the medial side of the second inner strip 144 at two locations; and the lateral side of the second inner strip 144 is attached to the medial side of the second outer strip 124 at three locations.

In one embodiment, this formation is accomplished by the following method. Initially, four sheets of scored corrugated paperboard are provided wherein each sheet has a longitudinal axis.

Then, the first sheet is longitudinally fed into a laminator which applies three glue lines to the top of the first sheet wherein one glue line runs along a medial portion of the sheet and the other two glue lines run along opposing edge portions of the sheet so that the three glue lines are generally parallel to the longitudinal axis of the first sheet.

Next, the second sheet is longitudinally fed into the laminator which applies two glue lines to the top of the second sheet wherein one of the glue line is about half-way between the medial portion of the second sheet and one longitudinal edge thereof and wherein the other glue line is about half-way between the medial portion of the second sheet and the other longitudinal edge thereof. Then, the bottom of the second sheet is placed on the glued top side of the first sheet.

Next, the glued pattern of the first sheet is repeated on the third sheet when the third sheet is longitudinally fed into the laminator such that three glue lines are disposed on the top of the third sheet wherein one glue line runs along a medial portion of the third sheet and the other two glue lines run along opposing edge portions of the third sheet.

Then, the bottom of the third sheet is placed on the glued top side of the second sheet and the bottom of the fourth sheet is placed on the glued top side of the third sheet thereby defining a four sheet slab.

With the gluing process finished, downward pressure is applied to the slab or to a plurality of stacked slabs for a period that allows the glue to dray, for example, about fifteen minutes.

Finally, each slab is cut perpendicular to its longitudinal axis at predetermined longitudinal lengths to obtain the desired width of the strips and thus, the thickness of the core 110.

In one embodiment, the core 110 is formed from, but not limited to, double walled corrugated paper board manufactured by, for example, Georgia-Pacific. Alternatively, single walled corrugated paper board or other materials may be utilized for forming the core 110.

Scored Sheets

As also noted above, the collapsible radiant barrier void filler 100 comprises first scored sheet 210 and second scored sheet 310.

Referring to FIGS. 1 through 5, the first and second scored sheets 210 and 310 of the collapsible radiant barrier void filler 100 take the form of, but are not limited to, a rectangular shape thereby forming a three-dimensional rectangularly shaped radiant barrier void filler 100 when in the expanded configuration. In one embodiment, the first and second scored sheets 210, 310 are of a substantially equal size and a similar construction of suitable rigid materials such as, but not limited to, corrugated paperboard or cardboard.

The first scored sheet 210 comprises a side portion 212 having an exterior face surface 214 and an interior face surface 216, and a pair of opposing end portions 218 and 228 having respective exterior surfaces 220, 230 and interior surfaces 222, 232. The interior surface 222 of end portion 220 is secured to the exterior or lateral surface 116 of the first outer strip 114 and the interior surface 232 of end portion 230 is secured to the exterior or lateral surface 126 of second outer strip 124 by suitable means, such as a layer of adhesive.

Additionally, the first scored sheet 210 comprises a medial fold line 234, a first edge fold line 236, and a second edge fold 238. Accordingly, the first edge fold line 236 folds and unfolds along an first adjacent edge 120 of the core 110, the second edge fold line 238 folds and unfolds along an second adjacent edge 130 of the core 110, and the medial fold line 234 folds and unfolds along the medial longitudinal axis 112 of the void filler 100 to attain a collapsed or folded configuration for shipment or storage and an expanded or unfolded configuration for use.

Similarly, the second scored sheet 310 comprises a side portion 312 having an exterior face surface 314 and an interior face surface 316, and a pair of opposing end portions 318 and 328 having respective exterior surfaces 320, 330 and interior surfaces 322, 332. The interior surface 322 of end portion 320 is secured to the exterior or lateral surface 116 of first outer strip 114 and the interior surface 332 of end portion 330 is secured to the exterior or lateral surface 126 of second outer strip 124 by suitable means, such as a layer of adhesive.

Additionally, the second scored sheet 310 comprises a medial fold line 334, a first edge fold line 336, and a second edge fold line 338. Accordingly, the first edge fold line 336 of second scored sheet 310 folds and unfolds along a third adjacent edge 140 of the core 110, the second edge fold line 338 of the second scored sheet 310 folds and unfolds along a fourth adjacent edge 150 of the core 110, and the medial fold line 334 folds and unfolds along the medial longitudinal axis 112 of the void filler 100 to attain a collapsed or folded configuration for shipment or storage and an expanded or unfolded configuration for use.

All of the fold lines or score indentations are preferably formed by a scoring bead or an integrally formed score indentation which extends along the longitudinal lengths of the respective scored sheets 210 and 310. The score indentations are formed by any well-known method, such as an automatic roller or a manual device, and are intended not to pierce, cut, or otherwise weaken the material.

Radiant Barrier Material

As further noted above, and referring to FIGS. 1 through 5, the collapsible radiant barrier void filler 100 comprises radiant barrier material 410. In one embodiment, the radiant barrier material 410 is disposed or secured upon at least one of the interior face surfaces 216, 316 of one of the first and second scored sheets 210, 310 wherein a reflective side 412 of the radiant barrier material 410 is juxtaposed adjacent at least one of the oppositely disposed cell side portions or opposing face portions 106, 108 (FIGS. 7 and 8) of the cell structure 110 in the expanded open cell configuration so as to maintain an air space 420 adjacent the first reflective side 412 wherein the air space 420 extends into the cell core structure 110.

Figure 6:
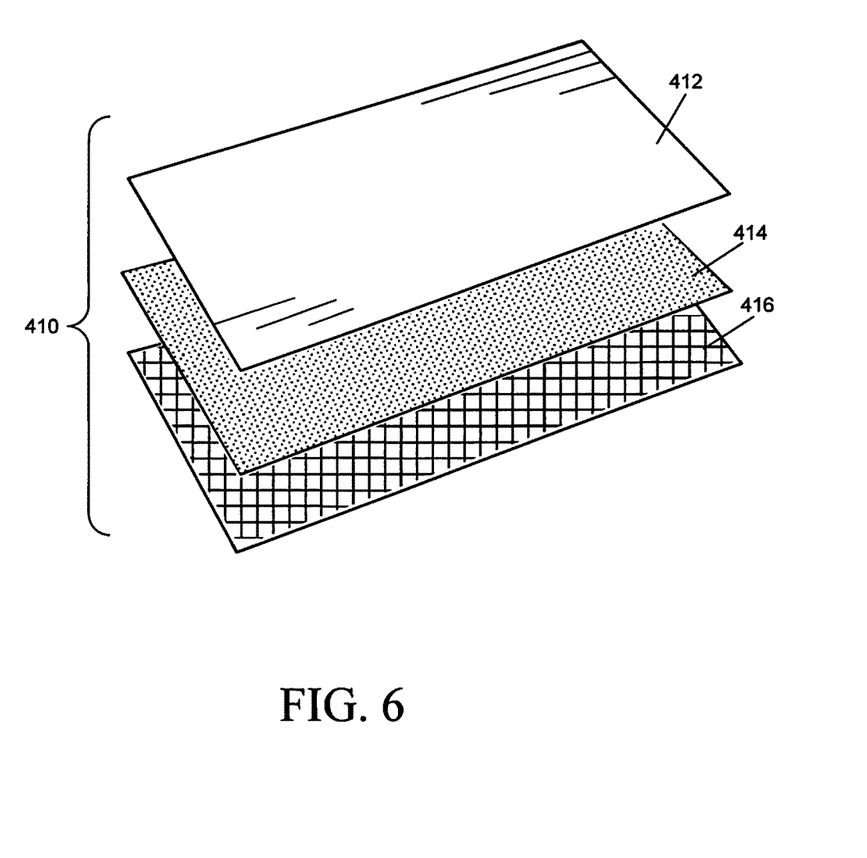
FIG. 6 is an exploded parts view of an embodiment of a radiant barrier.
Figure 7:
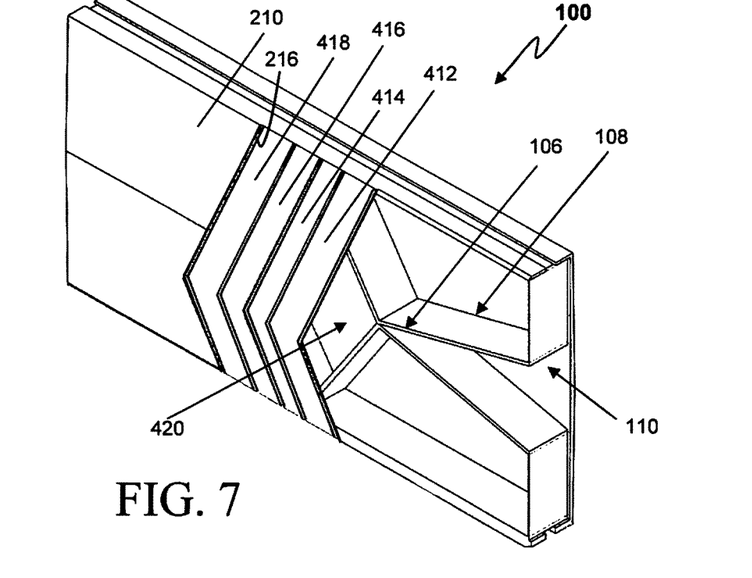
FIG. 7 is a perspective partially cut-away view of an embodiment of the collapsible radiant barrier void filler in the expanded configuration.
Figure 8:
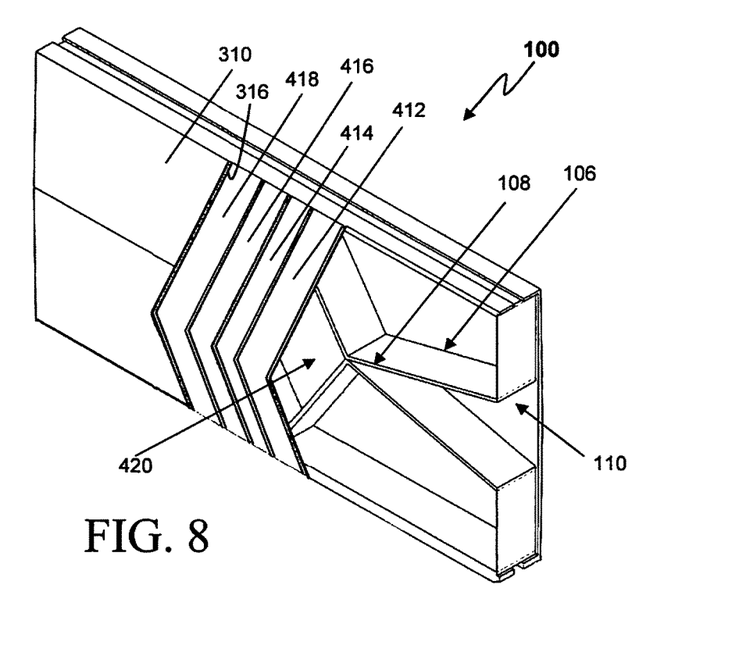
FIG. 8 is another perspective partially cut-away view of the collapsible radiant barrier void filler illustrated in FIG. 7.

More specifically, and referring to FIG. 6 through 8, an embodiment of the radiant barrier material 410 comprises a reflective structure or side 412 such as, but not limited to, a foil or metalized film such as an aluminum foil or a metalized polyethylene film for defining the reflective structure or side 412 of the radiant barrier 410; a base structure or substrate 416 such as, but not limited to, a fabric such as a polyethylene woven fabric defining an opposing second side of the radiant barrier 410, and a coupling means such as, but not limited to, an adhesive layer 414 interposed between the reflective structure or side 412 and the base structure or substrate 416 for providing a strong, lightweight, bendable, and durable radiant barrier material 410.

Referring to FIGS. 7 and 8, and in one embodiment, a first sheet of radiant barrier material 410 is secured on the interior face surface 216 of the first scored sheet 210 and a second sheet of the radiant barrier material 410 is disposed on the interior face surface 316 of the second scored sheet 310 wherein the reflective side 412 of each of the first and second sheets of the radiant barrier material 410 are respectively juxtaposed adjacent the oppositely disposed cell side portions 106 and 108 of cell core structure 110 in the expanded open cell configuration so as to maintain an air space 420 adjacent the reflective side 412 of each of the first and second sheets of the radiant barrier material 410 wherein the air space extends into the cell core structure 110. In one embodiment, an adhesive 418 is utilized to secure first and second sheets of radiant barrier material 410 to the respective interior face surfaces 216, 316 of the respective first and second scored sheets 210, 310 of the collapsible radiant barrier void filler 100. Specifically, the adhesive 418 is interposed between the base structure or substrate 416 of the first and second sheets of the radiant barrier material 410 and the respective interior face surfaces 216 and 316 of the respective first and second scored sheets 210, 310 of the collapsible radiant barrier void filler 100.

Additionally, and in one embodiment, the first sheet of radiant barrier material 410 continuously extends between the first and second fold lines 236, 238 and the lateral ends 240, 242 (FIG. 3) of the first scored sheet 210. Likewise, the second sheet of radiant barrier material 410 continuously extends between the first and second fold lines 336, 338 and the lateral ends 340, 342 of the second scored sheet 310. Furthermore, and in one embodiment, the first and second sheets of radiant barrier material 410 have a continuous and uninterrupted cross section along the longitudinal and lateral axis thereof.

In general, a variety of unique substrates including all types of polyesters, vinyls, polyimides, polyolephins, woven fabrics, non-woven fabrics, and fiberglass fabrics may be metalized for providing a strong, lightweight, durable, and bendable radiant barrier material 410.

Additionally, radiant barrier material 410 may be in the form of paint or spray coating that is disposed or secured on at least one of the interior face surfaces 216, 316 of one of the first and second scored sheets 210, 310 to provide a reflective side 412 of the paint or spray coating that is juxtaposed adjacent at least one of the oppositely disposed cell side portions 106, 108 of the cell structure 110 in the expanded open cell configuration so as to maintain an air space 420 adjacent the first reflective side 412 wherein the air space 420 extends into the cell core structure 110.

Figure 9:
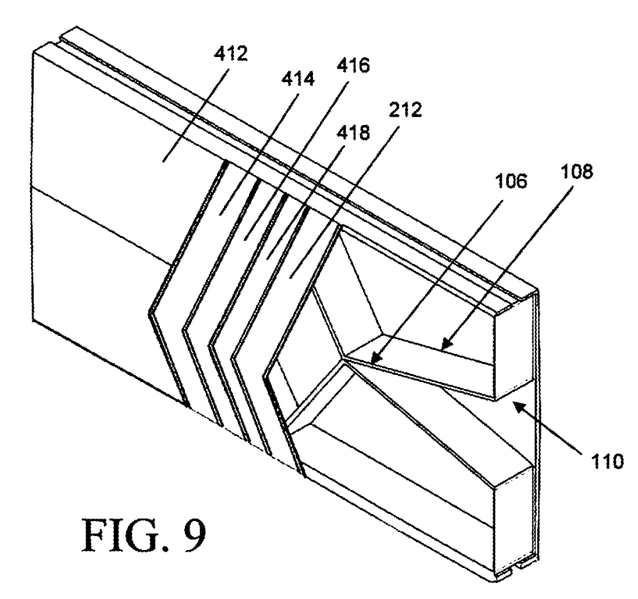
FIG. 9 is a perspective partially cut-away view of another embodiment of a collapsible radiant barrier void filler in the expanded configuration.
Figure 10:
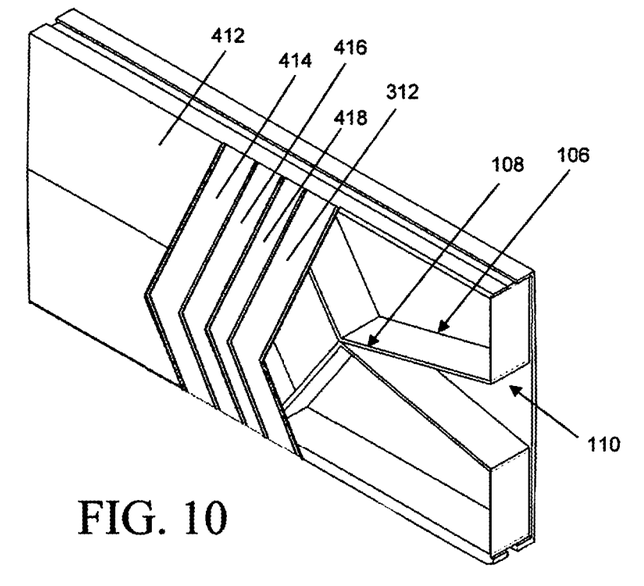
FIG. 10 is another perspective partially cut-away view of the collapsible radiant barrier void filler illustrated in FIG. 9.

In another embodiment, and referring to FIGS. 9 and 10, a first sheet of the radiant barrier material 410 is disposed on the exterior face surface 212 of the first scored sheet 210 and/or a second sheet of the radiant barrier material 410 is disposed on the exterior face surface 312 of the second scored sheet 310 wherein the reflective side 412 of each disposed sheet of the radiant barrier material 410 is outwardly facing of the respective cell side portions 106 and/or 108 of the open cell core structure 110 in the expanded open cell configuration.

Embodiment of Making the Collapsible Radiant Barrier Void Filler

In one embodiment, a method of making the collapsible radiant barrier void filler 100 comprises affixing adjacent core sheets to one another using lines of adhesive at selected points for forming a core sheet slab or assembly having a longitudinal axis; cutting the core sheet assembly perpendicular to the longitudinal axis at predefined longitudinal intervals to create a cell core structure having a plurality of, for example, hexagonally-shaped expandable and collapsible cells, the cell core structure having first and second opposing longitudinal end portions or outer lateral sides and first and second opposing face portions; providing a first scored sheet having a medial portion partitioned from a first edge portion by a first fold line and partitioned from an opposing second edge portion by a second fold line, the medial portion having a medial fold line wherein the first, second, and medial fold lines permit the first scored sheet to attain a collapsed and expanded configuration; applying a first radiant barrier material to an interior surface of the medial portion of the first scored sheet for providing a first interior radiant reflective surface; attaching the first longitudinal end portion of the cell core structure to an interior surface of the first edge portion of the first scored sheet; attaching the second longitudinal end portion of the cell core structure to an interior surface of the second edge portion of the first scored sheet; providing a second scored sheet having a medial portion partitioned from a first edge portion by a first fold line and partitioned from an opposing second edge portion by a second fold line, the medial portion having a medial fold line wherein the first, second, and medial fold lines permit the second scored sheet to attain a collapsed and expanded configuration; applying a second radiant barrier material to an interior surface of the medial portion of the second scored sheet for providing an second interior radiant reflective surface; attaching the first longitudinal end portion of the cell core structure to an interior surface of the first edge portion of the second scored sheet; attaching the second longitudinal end portion of the cell core structure to an interior surface of the second edge portion of the second scored sheet; and wherein the first and second interior radiant reflective surfaces of the first and second radiant barrier materials are respectively juxtaposed adjacent one of the opposing face portions in the expanded open cell configuration so as to maintain an air space adjacent each of the first and second interior radiant reflective surfaces wherein the air space extends into the cell core structure in the expanded open cell configuration.

In an alternative to the above method, one of the two applying steps of radiant barrier material may be eliminated.

In an alternative to the above method, one of the two providing steps of the first and second scored sheets may be eliminated.

In an alternative to the above method, the first and second radiant barrier materials may be applied to the exterior surfaces of the medial portions of the first and second scored sheets instead of (or in addition to) the interior surfaces wherein the radiant reflective surfaces would then face outwardly and not toward the air space in the cell core structure in the expanded open cell configuration.

Figure 11:
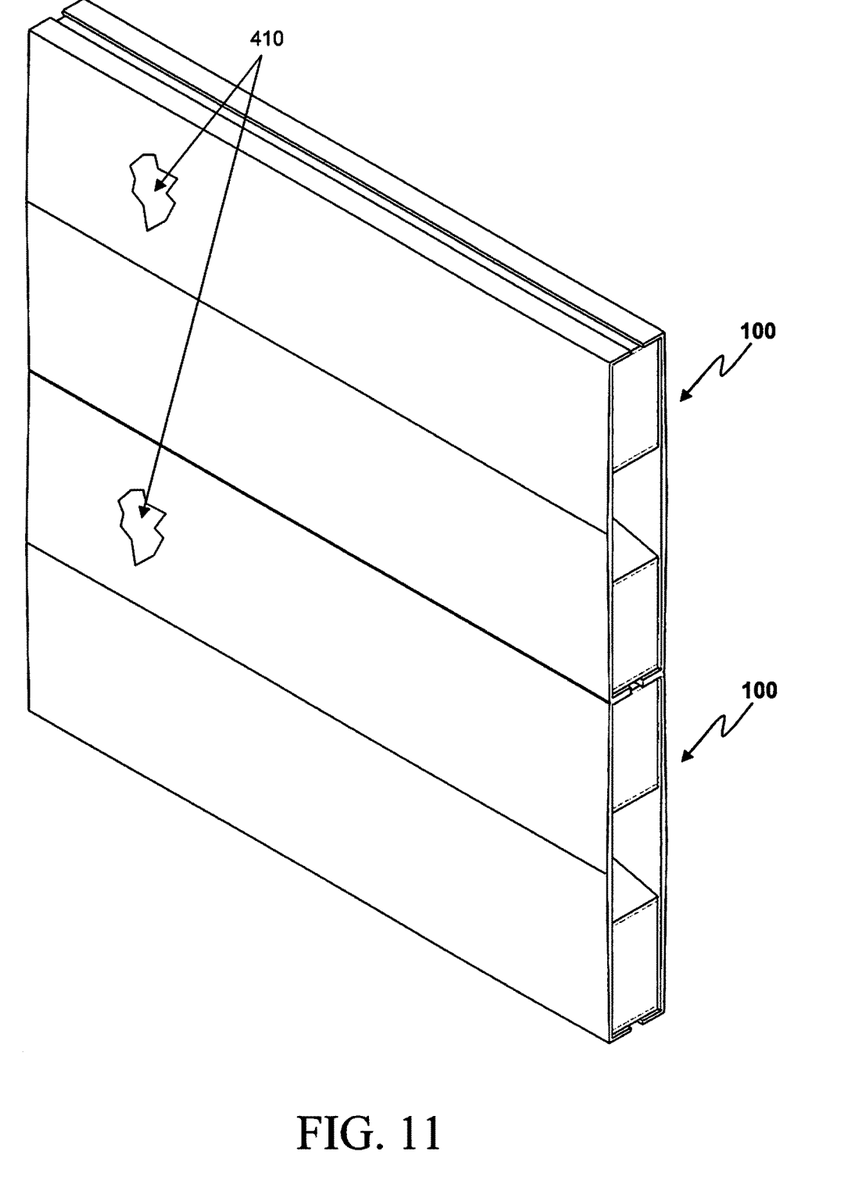
FIG. 11 is perspective view of an embodiment of two collapsible radiant barrier void fillers operatively coupled together and each in an expanded configuration.

Referring to FIG. 11, and in one embodiment, a plurality of the collapsible radiant barrier void fillers 100 may be coupled together by, for example attaching end portions 218, 318 of one radiant barrier void filler 100 to end portions 228, 328 of another barrier void filler 100 with, for example, adhesive.

Use and Operation

In use and operation, and referring to the drawings, one or more collapsible radiant barrier void fillers 100 can be employed in a variety of orientations to provide a radiant barrier void filler that blocks radiant heat energy and fills voids between articles or containers being transported in, for example, rail cars, trucks, and shipping containers and/or between articles or containers and one or more walls of the rail car, truck, or shipping container.

For example, when shipping wine, the wine gains or loses heat as a function of its outside environment. With the use of one or more collapsible radiant barrier void fillers 100, the wine can be protected from gaining or losing heat from the outside environment to a level that is outside a specific quality control range wherein wine that gains to much heat results in the wine being destroyed and wine that gives off too much heat may freeze thereby resulting in the packing being destroyed in the form of broken wine bottles and pushed out wine corks.

Figure 12:
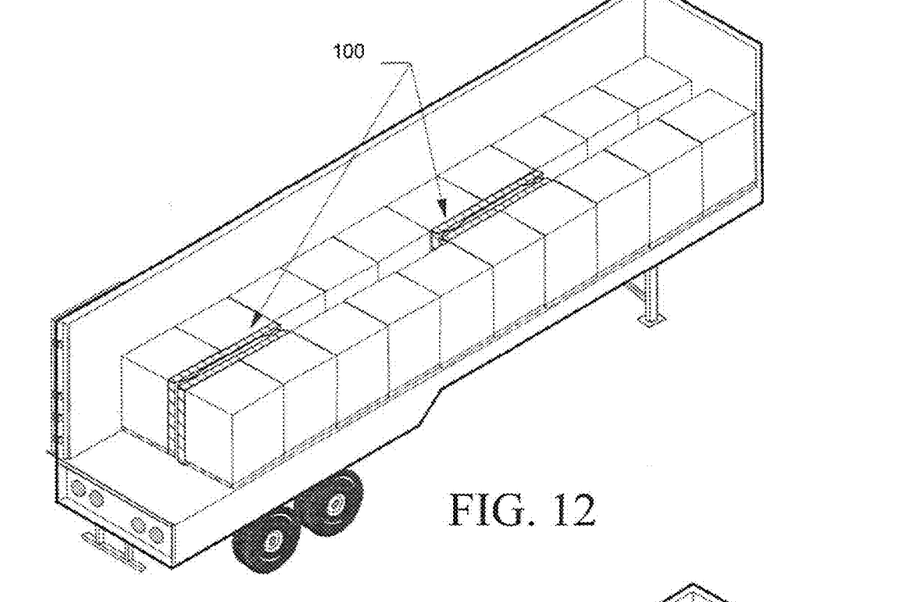
FIG. 12 is a rear side perspective view of a trailer showing placement of an embodiment of a plurality of collapsible radiant barrier void fillers each in an expanded configuration.
Figure 13:
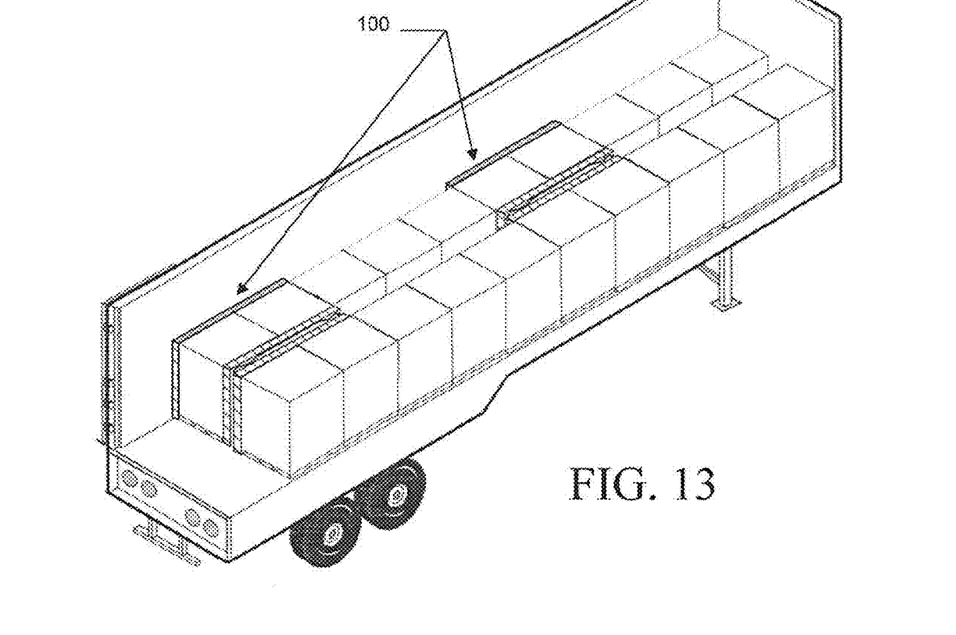
FIG. 13 is a rear side perspective view of a trailer showing further placement of an embodiment of a plurality of collapsible radiant barrier void fillers each in an expanded configuration.

Particular examples of use and operation of one or more collapsible radiant barrier void fillers 100 are illustrated in FIGS. 12 and 13.

In light of the above description, and in one aspect, an embodiment of the collapsible radiant barrier void filler 10 may be utilized in either a first position or a second position reversed from the first position such as by being rotated one-hundred-eighty degrees.

In light of the above description, and in another aspect, an embodiment of the collapsible radiant barrier void filler 10 abates heat transfer into or out of the load content or product being transported.

The above delineation of the collapsible radiant barrier void filler 100, including its use and operation, demonstrate the industrial applicability of this invention.

Moreover, it should be apparent that numerous modifications and adaptations may be resorted to without departing from the scope and fair meaning of the present invention as described hereinbelow by the claims.

We claim:

1. A collapsible radiant barrier void filler, comprising:
    first and second scored sheets having interior and exterior face surfaces and fold lines for permitting said first and second sheets to attain collapsed and expanded configurations;
    a cell core structure being collapsible to a closed cell configuration and expandable to an open cell configuration, said cell core structure having a first outer strip having an exterior surface directly secured to both a first interior surface of said first scored sheet and a first interior surface of said second scored sheet, and said cell core structure having a second outer strip having an exterior surface directly secured to both a second interior surface of said first scored sheet and a second interior surface of said second scored sheet, and said cell core structure having oppositely disposed cell side portions; and
    a radiant barrier material having a reflective first side and an opposing second side wherein said second side is secured upon at least one of said interior face surfaces of one of said first and second scored sheets and wherein said reflective first side is juxtaposed adjacent at least one of said oppositely disposed cell side portions in said expanded open cell configuration so as to maintain an air space adjacent said reflective first side wherein the air space extends into said cell core structure in said open cell configuration.

2. The collapsible radiant barrier void filler of claim 1 wherein the air space extends from said reflective first side and into said cell core structure in said open cell configuration a distance of at least three-quarters of an inch.

3. The collapsible radiant barrier void filler of claim 1 wherein radiant barrier material comprises a metalized polyethylene film defining said reflective first side of said radiant barrier material and a polyethylene fabric defining said second side of said radiant barrier material.

4. The collapsible radiant barrier void filler of claim 1 wherein said radiant barrier material comprises an aluminum foil defining said reflective first side of said radiant barrier material bonded to a woven polyethylene defining said second side of said radiant barrier material.

5. The collapsible radiant barrier void filler of claim 1 wherein said radiant barrier material comprises a coating.

6. The collapsible radiant barrier void filler of claim 1 wherein said first and second scored sheets are formed from corrugated paper.

7. The collapsible radiant barrier void filler of claim 1 wherein said cell core structure is formed from corrugated paper.

8. A collapsible radiant barrier void filler, comprising:
    first and second scored sheets having interior and exterior surfaces and fold lines for permitting said first and second sheets to attain collapsed and expanded configurations;
    a cell core structure being collapsible to a closed cell configuration and expandable to an open cell configuration; said cell core structure having a first outer strip having an exterior surface directly secured to both a first interior surface of said first scored sheet and a first interior surface of said second scored sheet, and said cell core structure having a second outer strip having an exterior surface directly secured to both a second interior surface of said first scored sheet and a second interior surface of said second scored sheet, and said cell core structure having oppositely disposed cell side portions; and
    first and second radiant barrier materials each having a reflective first side and an opposing second side wherein said second side of said first radiant barrier material is secured upon said interior surface of said first scored sheet and said second side of said second radiant barrier material is secured upon said interior surface of said second scored sheet; and
    wherein said reflective first sides of said first and second radiant barrier materials face one another in a spaced apart relationship and are respectively juxtaposed adjacent one of said oppositely disposed cell side portions in said expanded open cell configuration so as to maintain an air space adjacent each of said reflective first sides wherein the air space extends into said cell core structure in said open cell configuration.

9. The collapsible radiant barrier void filler of claim 8 wherein said air space extends from said reflective first sides of said first and second radiant barrier materials and into said cell core structure in said expanded open cell configuration a distance of at least three-quarters of an inch.

10. The collapsible radiant barrier void filler of claim 8 wherein said first and second radiant barrier materials each comprises a metalized polyethylene film defining said reflective first sides and a polyethylene fabric defining said second sides.

11. The collapsible radiant barrier void filler of claim 8 wherein said first and second radiant barrier materials each comprises an aluminum foil defining said reflective first sides and a woven polyethylene defining said second sides.

12. The collapsible radiant barrier void filler of claim 8 wherein said first and second radiant barrier materials each comprises a coating.

13. The collapsible radiant barrier void filler of claim 8 wherein said first and second scored sheets are formed from corrugated paper.

14. The collapsible radiant barrier void filler of claim 8 wherein said cell core structure is formed from corrugated paper.

15. A collapsible radiant barrier void filler, comprising:
a scored sheet having an interior surface, an exterior surface, and fold lines to attain collapsed and expanded configurations;
a cell core being collapsible to a closed cell configuration and expandable to an open cell configuration, said cell core having a first outer strip having an exterior surface directly secured to a first interior surface of said scored sheet, and said cell core structure having a second outer strip having an exterior surface directly secured to a second interior surface of said scored sheet, and said cell core having oppositely disposed cell side portions; and
a radiant barrier having a reflective first side and an opposing second side wherein said second side is secured upon said interior surface of said scored sheet and wherein said reflective first side is juxtaposed adjacent at least one of said oppositely disposed cell side portions in said expanded open cell configuration so as to maintain an air space adjacent said reflective first side wherein the air space extends into said cell core in said open cell configuration.

* * * * *